(12) United States Patent
Ormerod et al.

(10) Patent No.: US 7,255,221 B2
(45) Date of Patent: Aug. 14, 2007

(54) TRANSPORT DEVICE IN A CARD EMBOSSING SYSTEM

(75) Inventors: Simon Ormerod, Mardie (FR); Lucien Dugachard, Cachan (FR); Christophe Bousquet, Antibes Juan les Pins (FR); Fabien Gardes, Boigny sur Bionne (FR)

(73) Assignee: Datacard Corporation, Minnetonka, MN (US)

( * ) Notice: Subject to any disclaimer, the term of this patent is extended or adjusted under 35 U.S.C. 154(b) by 522 days.

(21) Appl. No.: 10/451,043

(22) PCT Filed: Oct. 18, 2002

(86) PCT No.: PCT/FR02/03577

§ 371 (c)(1),
(2), (4) Date: Jan. 23, 2004

(87) PCT Pub. No.: WO03/034330

PCT Pub. Date: Apr. 24, 2003

(65) Prior Publication Data

US 2004/0112710 A1  Jun. 17, 2004

(30) Foreign Application Priority Data

Oct. 19, 2001 (FR) .................................. 01 13555

(51) Int. Cl.
*G06K 17/00* (2006.01)
(52) U.S. Cl. ................................. 198/474.1; 198/347.2
(58) Field of Classification Search ............. 198/474.1, 198/346.2, 347.2, 347.4; 414/222.07, 223.1, 414/225.01; 235/380

See application file for complete search history.

(56) References Cited

U.S. PATENT DOCUMENTS

| 4,820,913 | A | * | 4/1989 | Haddock | 235/487 |
|---|---|---|---|---|---|
| 4,995,501 | A | | 2/1991 | Lundstrom et al. | 198/341 |
| 5,097,940 | A | * | 3/1992 | Manservigi et al. | 198/447 |
| 5,121,052 | A | * | 6/1992 | Nickerson | 324/754 |
| 5,332,889 | A | | 7/1994 | Lundstrom et al. | 235/380 |
| 5,562,278 | A | * | 10/1996 | Muller et al. | 270/58.21 |
| 5,614,707 | A | | 3/1997 | Lundstrom et al. | 235/479 |
| 5,716,313 | A | * | 2/1998 | Sigrist et al. | 493/438 |
| 6,142,370 | A | | 11/2000 | LaManna et al. | 235/380 |
| 6,186,313 | B1 | * | 2/2001 | Spatafora et al. | 198/474.1 |
| 6,352,206 | B1 | * | 3/2002 | Ashley et al. | 235/475 |
| 6,519,497 | B1 | * | 2/2003 | Blome et al. | 700/58 |
| 6,845,711 | B2 | * | 1/2005 | Platel et al. | 101/44 |
| 7,077,259 | B2 | * | 7/2006 | Breidenbach | 198/474.1 |

FOREIGN PATENT DOCUMENTS

| FR | 2766945 | 2/1999 |
|---|---|---|
| FR | 2796000 | 1/2001 |

* cited by examiner

*Primary Examiner*—Douglas Hess
(74) *Attorney, Agent, or Firm*—Perman & Green, LLP (57) ABSTRACT

A device is constructed for processing or customizing cards or flattened portable objects, for example memory cards, smart card, magnetic strip card, or badge. The device is characterized in that it comprises a flexible or rigid mobile transport structure (1) bearing at least transport means (2) for receiving at least a card (9) in at least a supply station (39) and carrying the cards to one or several processing stations (3). The transport device (2) is mobile relative to the transport structure (1) and enables the card to be displaced towards the processing station (3) or to be displaced inside said station, or a combination of both, without leaving said transport structure.

25 Claims, 4 Drawing Sheets fig. 1 fig.2 fig. 3 fig. 4 fig. 5 fig. 6

TRANSPORT DEVICE IN A CARD EMBOSSING SYSTEM

This application claims the benefit of the earlier filed International Application No. PCT/FR02/03577, International Filing Date, 18 Oct. 2002, which designated the United States of America, and which international application was published under PCT Article 21(2) as WO Publication No. WO 03/034330 A1.

This invention relates to a device for processing or personalizing cards or portable flat objects, such as, for example, memory cards, chip cards, magnetic tape cards, or badges.

Due to the increasingly popular use of cards such as, for example, credit cards, telephone cards or electronic purses, numerous systems are required to process the information contained in these cards or even the cards themselves, when these cards are used as well as when they are produced or personalized before being delivered to the user.

To be processed physically as well as from the point of view of the data contained in these cards, automated manipulation is very often used, which is sometimes performed on a very large number of cards, each of which may be processed differently. Various devices for transporting or transferring cards are thus used to move the cards to be processed from one processing station to another.

In the present description, reference will be made more specifically to a system whose purpose is to personalize cards such as badges or plastic cards with or without integrated circuits by means of embossing or stamping in relief according to the application and the user for whom they are intended, but it should be understood that the device described may be applied to any system in which cards of this type or similar type are mechanically manipulated.

In a system for personalizing cards, a certain number of procedures can be performed that include embossing operations consisting in performing a stamping in relief of the card, by means of, for example, plastic deformation of the card or controlled deposition of material on its surface. Other procedures may be, for example, a printing of one or several surfaces of the card, or an electronic personalization of the memory by means of electric contacts, magnetic tracks or devices called "touchless", such as a radio or induction antenna, or a control of the cards at the end of the personalization.

To supply with cards one processing station or between two stations, the cards can be conveyed by a conveyor to the station, then set and kept directly within the station, such as described in the patent FR 99 08782. To accelerate the transfers and improve the precision of the operations, certain solutions consist of using a cart that picks up a card from a conveyor and carries it to the processing station.

The patent U.S. Pat. No. 5,614,707 describes a cart that takes a card between two arms, and that is then moved on a rail to deposit a card in a programming station, which involves numerous retrievals of the card, resulting in inaccuracies and incidents.

The patent U.S. Pat. No. 4,995,501 describes a cart that takes a card in one or two spring clamps provided with pins applied to the card. The cart is then moved on a trackway by means of a step-by-step motor through one or several personalizing stations, which can process the card without it being released by the clamps.

Due to the fact that the cart has only a single path, the processing rate is however limited to the treatment of one card at a time. Furthermore, in case the surface of the card is somewhat fragile, for example immediately after it has been printed, or if the springs are too tight, the pins that are tightening the card may also leave anaesthetic marks on it.

The patent FR 97 09643 describes an electronic personalization small barrel with several processing sites, which takes the cards from a conveyor and processes them during its rotation. The fact that there are several processing sites thus makes it possible to supply the processed cards at a greater rate than the processing rate for a single site.

However, this device requires having a processing device for each site, and does not allow the application of several different or complementary processings during the passage in the small barrel. In addition, these processing devices must be independent from the frame, since being mounted on a movable support, which limits the types of processing that can be done or complicates their implementation.

The aim of this invention is thus to overcome at least one of the drawback of the prior art.

This aim is achieved by a card processing device comprising a movable transport structure that may be flexible or rigid, carrying at least one transport device comprising transport means to receive at least one card in at at least one supply station, and conveying said card to one or several processing stations, the transport device being movable in relation to the transport structure, and allowing moving of the card towards the processing station or moving inside this station, or a combination of the two, without leaving said transport structure, characterized in that it comprises at least one transfer device to drive at least one transport device and in that said transport structure is a rigid small barrel of essentially cylindrical shape, that conveys by rotation around one barrel axis the transport device from one station to another.

According to one feature, the device comprises at least one transfer device, which is fixed in relation to at least one so-called corresponding station, this transfer device comprising moving means ensuring the placing and moving, for a processing in said processing station, of at least one transport device carrying a card, so that said card is processed without being released by the transport device.

According to one feature, at least one transfer device is carried in a transfer position by a transfer support fixed in relation to the corresponding processing station, the position of this transfer device in relation to this corresponding processing station being determined by a transfer positioning device comprising at least one first reference part, integral with the transfer support, reversibly separable from at least one second reference part, integral with the transfer device, these two parts comprising positioning means working together to form a stop ensuring an identical position of this transfer device in relation to the corresponding processing station after separation and remounting of these two reference parts, or after replacement of this transfer device by another.

According to one feature, at least one transfer positioning device comprises first setting means, allowing modification or adjustment of the position of the first reference part of said transfer positioning device in relation to the corresponding processing station.

According to one feature, at least one transfer-positioning device comprises second setting means allowing adjustment of the position of its transfer device in relation to the second reference part of the said transfer positioning device.

According to one feature, at least one processing station is carried by a so-called station support structure, the position of this processing station in relation to the station support being determined by a station positioning device comprising at least one first reference part, integral with the station support, reversibly separable from at least one second reference part, integral with this processing station, these two parts comprising positioning means working together to form a stop ensuring an identical position for this processing station in relation to the station support after separation and remounting of these two reference parts, or after replacement of this processing station by another.

According to one feature, at least one station positioning device comprises first setting means allowing modification or adjustment of the position of the first reference part of said station positioning device in relation to its station support.

According to one feature, at least one station positioning device comprises second setting means allowing adjustment of the position of its processing station in relation to the second reference part of said station positioning device.

According to one feature, the transport means of at least one transport device comprises at least one clamp comprising an upper jaw and a lower jaw maintained normally closed on the card by at least one spring.

According to one feature, the clamp maintains the card by means of members, called pads, of an elastic material that is bent under the force of closing and thus limiting the contact pressure applied to at least one of the surfaces of the card to avoid marking it.

According to one feature, the clamp presents operating means comprising at least one opening rod operating the opening of the jaws of the clamp under the action of an actuator external to the clamp.

According to one feature, at least one transport device is driven by at least one transfer device according to a linear moving parallel to the barrel axis, and is guided by guiding means integral with the barrel.

According to one feature, at least one transfer device comprises motorization means allowing continuous moving, that is to say being able to stop in any intermediate position without being limited by a minimum moving step.

According to one feature, at least one transfer device acts on at least one transport device by an indexing finger driven by a belt, itself driven by a motor of a type incorporating a position marker and a servo system for moving to this marker.

According to one feature, the supply station receives the cards by means of a conveyor along a direction parallel to the barrel rotation axis.

According to one feature, the transport structure carries each transport device to at least one supply station after passing through at least one processing station, so that the card processed is deposited on the same conveyor that previously carried it to said supply station.

According to one feature, at least one processing station comprises one station for embossing cards by plastic deformation or stamping in relief.

According to one feature, the device comprises several stations for embossing or stamping in relief, each station performing the embossing of a different area on the same card.

According to one feature, at least one station for embossing comprises at least one embossing wheel carrying two sets of male and female matrices arranged in rings around the axis of this wheel and performing the embossing by approaching themselves along a direction parallel to this axis, the passage from one character to be embossed to another on the card to be embossed being done by moving of the transport device carrying said card.

According to one feature, at least one station for embossing comprises at least one embossing wheel driven directly by a motor of a type incorporating a position marker and a servo system for moving to this marker.

According to one feature, at least one station for embossing comprises at least one embossing wheel whose characters are stamped by an electromagnet or a solenoid by means of at least one angular gear mechanism.

According to one feature, at least one angular gear mechanism comprises at least one of its parts movable, which, after a character is stamped, is returned to its original position by at least one return spring.

According to one feature, at least one processing station comprises a test station checking the conformity of the processing completed or to be completed on a card, compared with the predetermined or personalized information.

According to one feature, at least one processing station comprises a station for personalization of information of the electronic, magnetic, or optical type, or a combination of these types, contained in a card.

According to one feature, at least one processing station comprises a station for printing cards.

The invention, with its characteristics and advantages, will be understood more clearly by reading the description based on the attached drawings, in which.

Figure 1:
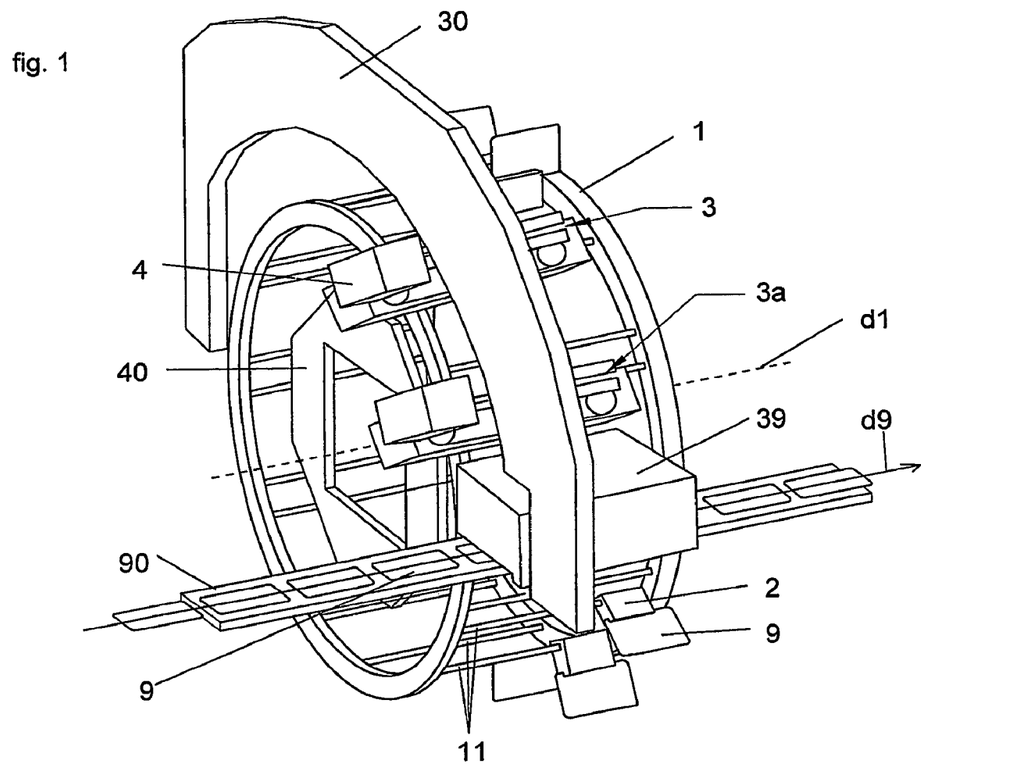
FIG. 1 shows a partial perspective view of the device according to the invention (the clamps being shown schematically, and only the wheel of the stations for embossing being shown)

In one embodiment shown in FIG. 1, the device according to the invention comprises a structure (1) in the form of a cylindrical small barrel rotating around a barrel axis (d1) parallel to the path direction (d9) on a conveyor (90) of the cards (9) to be processed, this barrel axis (d1) being essentially located in the plane of said cards on the conveyor. This small barrel (1) carries one or more transport devices (2), and positions each of these transport devices (2) successively facing a supply station (39), from which it picks up a card (9) to be processed, then facing one or several processing stations (3) without the card (9) ever being released by this transport device, then brings back said transport device to the supply station where the processed card is deposited on the conveyor.

One or several processing or embossing stations (3) are arranged in a certain number of angular positions at regular intervals, e.g., a twelfth of one turn of the barrel, and are supported by a fixed structure, the so-called station support (30). For each moving of the barrel, a new card held in a transport device is thus carried in front of each processing station, each station thus performs its own operations on a different card. The combination of several processing stations in the device thus makes it possible to perform several operations on each card when it passes into the barrel, while maintaining a production rate close to the rate of the slower station.

Figure 2:
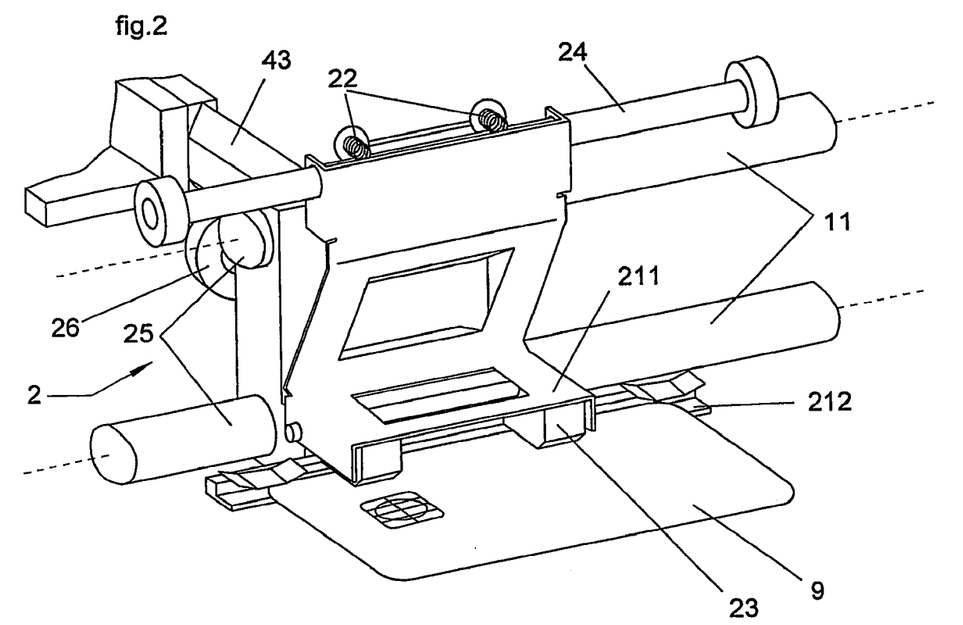
FIG. 2 shows a partial perspective view of a transport device integrated with a device according to the invention.

The transport devices (2) are movable in relation to the barrel (1) along a direction parallel to the barrel axis (d1), and are guided for this purpose by guiding means (11), consisting of two cylindrical rods per transport device (2), whose axes are parallel to the axis barrel (d1). This device comprises a clamp whose body has two parallel holes provided with two ball bushes into which the rods of the guiding means (11) slide.

This clamp (21) comprises an upper jaw (211) and a lower jaw (212), these jaws can be fitted out with pads (23) made of rubber, for example, to avoid marking the cards. The lower jaw (212) is integral with the body of the clamp (21), and the upper jaw pivots around an axis that is approximately parallel to the guiding direction of the guiding means (11). This upper jaw is maintained in pressure on the card (9) to be transported by the pressure of two springs (22) bearing upon the body of the clamp (21). The clamp (21) is thus normally closed and can be opened by the mechanical action of a known type of actuator on an opening rod (24) integral with the upper jaw (211), in a movement resisting the pressure of the springs (22) to make this upper jaw (211) pivot in the opening direction.

In one embodiment (not shown), the conveyor (90) comprises two parallel rails in the form of angle bars which are supporting and guiding the two opposite edges of the cards. The cards slide onto these two rails being driven by a belt with drivers, located at the center and below the conveyor, the drivers pushing the rear edge of the card on its edge. Within the supply station (39), the rail in the direction of the barrel (1) is switched off, and the lower jaw (212) of a clamp (21) takes its place. When a card is positioned on the lower jaw (212), the opening rod (24) is released and the clamp (21) closes under the effect of the springs (22) on the card (9), the card (9) then being held by the clamp (21) in a plane containing the barrel axis (d1).

Figure 3:
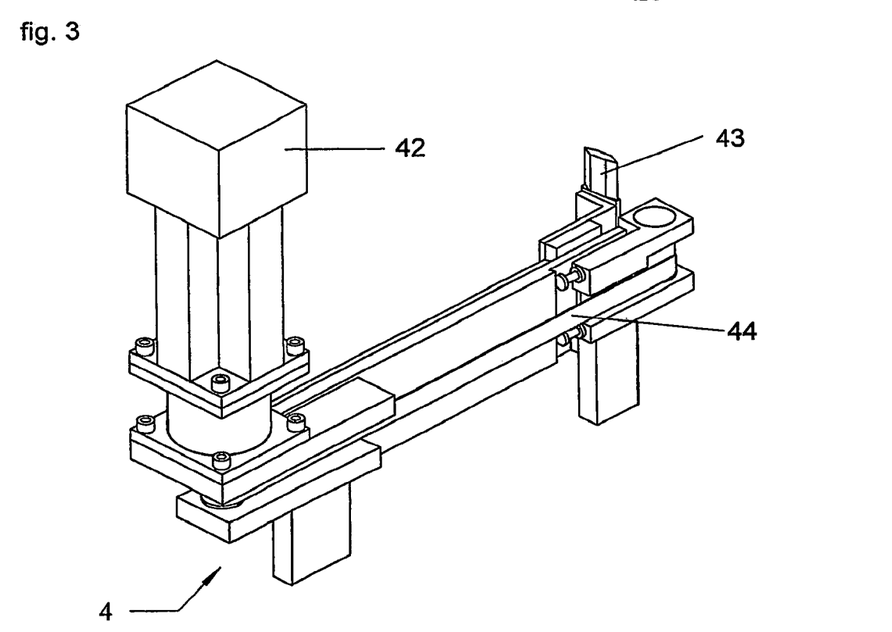
FIG. 3 shows a partial perspective view of a transfer device integrated with a device according to the invention.

When the barrel (1) rotates, the clamp (21) holding the card (9) is then moved and carried at an angular position facing that of a transfer device (4). This device is suitable for the transfer of said clamp, and thus the card, between its position during the rotation of the barrel and a so-called corresponding processing station (3), such as an embossing station. This transfer device can also perform movings of the clamp and the card within the processing station.

One or several transfer devices (4) are arranged in a certain number of angular positions at regular intervals, such as a twelfth of a turn of the barrel, and are supported by a fixed structure, so-called transfer support (40). Each of these transfer devices (4) comprises a motor (42) actuating a belt (44), this belt driving an indexing finger (43) linearly along a direction parallel to the barrel axis (d1). This indexing finger (43) comprises an extended part with its axis perpendicular to its moving, that protrudes outside its transfer device (4). When a transport device (2) is positioned facing a transfer device (4), the indexing finger (43) is fitted between two rollers (26) carried by the body of the clamp (21).

In one embodiment, on all the angular positions without a transfer device, the device comprises a crown (12) located in a plane perpendicular to the barrel axis (d1), on each side of which the rollers (26) of the clamp (21) roll during the rotation of said barrel. This crown is fixed in relation to the transfer support (4) and thus maintains the transport device (2) in the same longitudinal position in relation to its linear guiding means (11).

Figure 4:
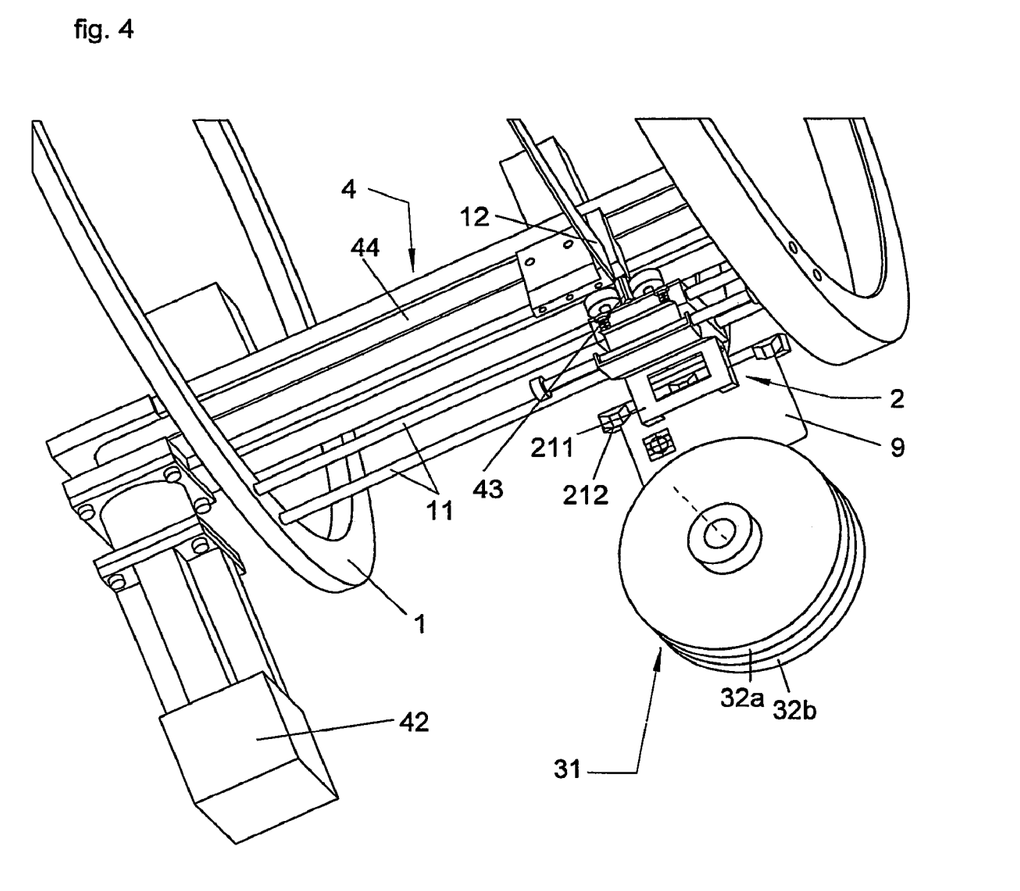
FIG. 4 shows a perspective view of a device according to the invention in a situation in which a card is being processed in a station for embossing (only the embossing wheel being shown)

When a transport device (2) is positioned facing a transfer device (4), the motor (42) of this transfer device is controlled by a control system (not shown) to move said transport device (2) along the rods of its guiding means (11) via means of the indexing finger (43). Thus, by means of the moving of the transport device (2) assembly, the card can be moved without being released during the entire processing period performed by the corresponding processing station (3), for example an embossing operation.

Advantageously, the motor (42) of the transfer device (4) is of a type comprising an internal encoder and position marker as well as an internal servo system for its movings, for example of the "Brushless" trademark (pending trademark). Such an internal control system thus allows positioning of the card at any intermediate position along the entire path, without being limited to a certain number of predetermined positions by a minimum moving step, as is the case with a step-by-step motor.

In one embodiment, a processing station (3) comprises an embossing station, intended to perform a stamping in relief by plastic deformation of the card (9) between two complementary dies. In one embodiment illustrated in FIG. 5, this embossing is performed by an embossing wheel (31) comprising, on its periphery, two groups of housings distributed in two rings or flanges (32a, 32b) located on either side of the plane of the card to be embossed. The dies of the characters or symbols to be embossed are arranged in these housings. Each of these symbols uses a male die and a female die, each arranged in one of the groups of housings. These housings allow the dies to slide parallel to the axis (d3) of rotation of the embossing wheel to come into contact with the two sides of the card to be embossed.

Figure 5:
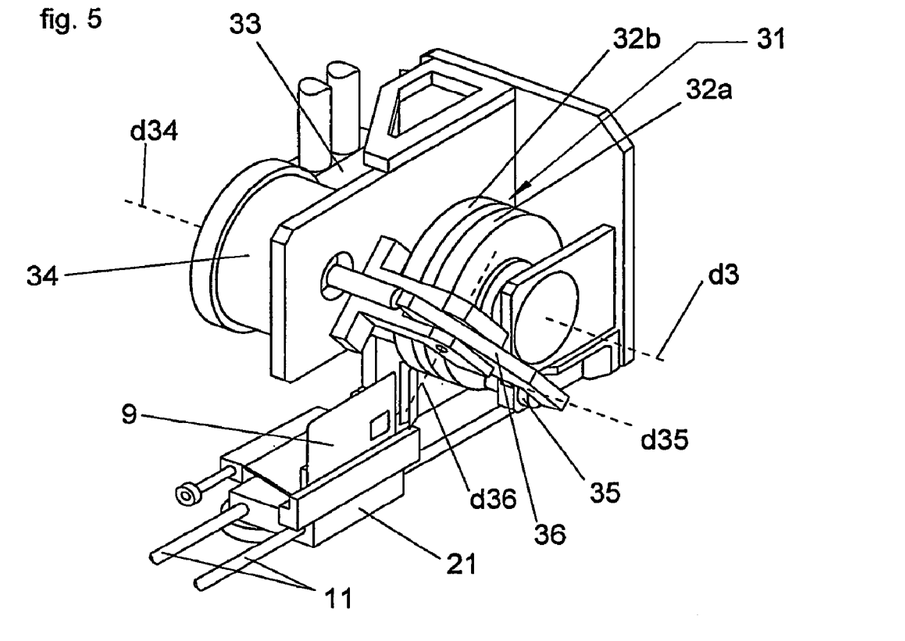
FIG. 5 shows a perspective view of a station for embossing cards of a device according to the invention.

For each form of character to be embossed, the embossing wheel is rotated by a motor (33) so as to move the complementary forms of the character to be embossed into a position located on the path of the stamping part (35). This stamping part is actuated by an electromagnet (34) via a gear part forming an angular gear between the direction (d34) of moving of the electromagnet and the direction (d35) of moving of the stamping part (35), by pivoting around a gear axis (d36). The card (9) to be embossed is carried between the flanges (32a, 32b) of the embossing wheel (31) and moved, by the clamp (21) which carries it, so that the position where the chosen character is to be embossed is facing the corresponding character on this embossing wheel. After stamping each character, the card (9) is moved again by its clamp (21) in order to get into position adequately for the next character to be embossed on the same line parallel to the guiding means (11).

Advantageously, one or several of the parts (35, 36) constituting this angular gear mechanism are carried back to their original position by a return spring. This arrangement makes it possible to modify the distribution of inertia of the various parts operated by the electromagnet, and can improve the performance, reliability or setting facility of them. Advantageously, the motor (33) actuating the wheel (31) of the embossing station (3) is of a type comprising an internal encoder and position marker as well as an internal servo system for its movings, for example of the trademark "Brushless" (pending trademark). Such a control system thus allows positioning of the embossing wheel at any intermediate position along its rotating path, without being limited to a certain number of predetermined positions by a minimum moving step, as is the case with a step-by-step motor.

When the cards to be processed contain several lines of symbols to be embossed, the device according to the invention may comprise several embossing stations (3, 3a; FIG. 1), each one being positioned at a distance from the barrel (1) axis (d1) corresponding to the position of a different line to be embossed on a same card (9).

It may be useful to be able to perform settings or tests on a processing or embossing station by stopping the assembly of the device only for a short while or not at all, due to the time and production losses that this may require.

Figure 6:
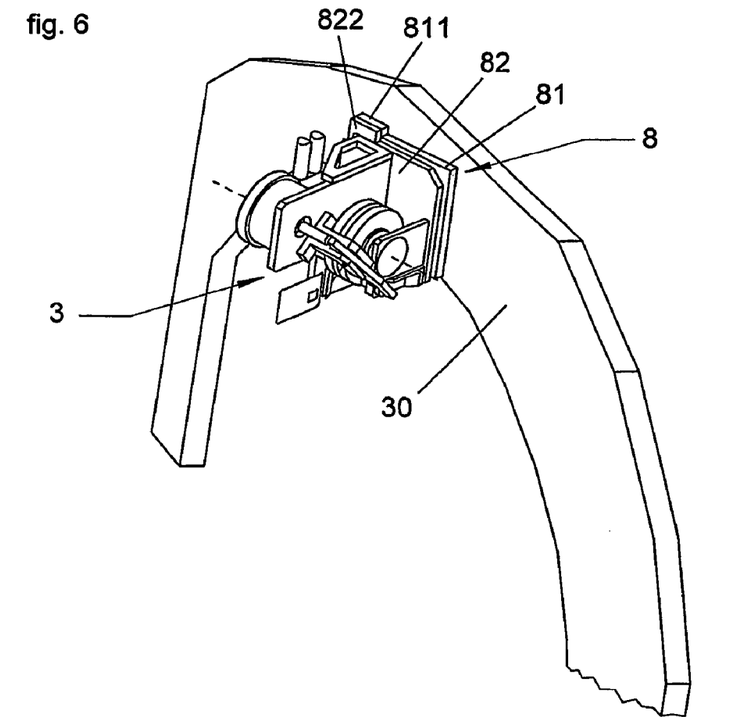
FIG. 6 shows a partial perspective view of a station for embossing connected to the station support by a station positioning device.

In an embodiment illustrated in FIG. 6, the embossing stations (3) or processing stations are each fixed and positioned on the station support (30) by means of a station positioning device (8). This station positioning device comprises a first reference part (81) integral with the station support (30) and a second reference part (82) integral with the station. These two reference parts (81, 82) may be joined or separated from each other by means of a known type of quick fixing means (not shown), for example grips, clips or cam devices.

In order to present a constant relative position between them from one disassembly to another, these two reference parts (81, 82) also comprise positioning means working together to form one or several stops, defining for one of these two reference parts a determined position in space in relation to the other reference part.

These positioning means may comprise, for example, several hardened and ground planar surfaces coming into contact in three non-coplanar directions to form a stop in these three directions. The reference parts may, for example, be two plates fixed respectively to the station support and to the station, these plates having facing surfaces forming the positioning means.

It may be useful to be able to obtain an identical position of the embossing wheel (31) or processing means in relation to the station support (30) and to the barrel for all the locations, so-called station locations, of the station support where a processing or embossing station can be implanted. To this end, such a station positioning device (8) comprises first setting means (811) allowing an adjustment of the relative position in the space of the first reference part (81) in relation to the station support. It is thus possible to mount a same station at any station location while maintaining the same positioning of the embossing wheel in relation to the station support.

It may also be useful to be able to obtain an identical position of the embossing wheel (31) or processing means in relation to the station support (30) and to the barrel for any station of the same type. To this effect, such a station positioning device (8) comprises second setting means (822) allowing an adjustment of the relative position in space of the processing or embossing station in relation to the second reference part (82).

Such setting means may, for example, comprise millimetric or micrometric screws, making it possible to obtain high precision and repeatability, for example, of the order of a tenth or one-hundredth of a millimeter.

Being able to set up all the station locations in an identical manner in relation to the station support (30) with respect to the first reference part (81) of their station positioning device (8), and all the stations (3) in an identical manner with respect to the second reference part (82) that they carry, makes it possible to have good interchangeability between stations. The processing or embossing stations are thus interchangeable between themselves and from one location to another on the transport path. Such interchangeability has great advantages in that it is not necessary to stop production to perform maintenance operations or settings on the various processing or embossing stations.

For example, it is possible to perform a servicing or maintenance operation on a station by positioning it on a test support separate from the production machine, i.e., off-line. If a replacement station already set is available, it is thus possible to disassemble the station to be serviced and to replace it quickly with the replacement station while maintaining the same positioning of its embossing wheel or processing means in relation to the body. It is thus possible to replace this station without settings on the machine and thus without interrupting production for an extended period.

Likewise, it is also possible to perform a first off-line setting of one or several replacement stations to adapt them to the needs of a new production, then to mount these stations already set on their station locations without interrupting production for an extended period.

In one embodiment (not shown), the transfer devices (4) are each fixed and positioned on the transfer support (40) by means of a transfer positioning device similar to the station positioning device (8) described above.

The internal position and setting of each transfer device in relation to its corresponding embossing or processing station (3) may actually be important to obtain a satisfactory quality of embossing or processing. These internal or position settings may, for example, be used to set or modify the position of the areas to be embossed, in one line or between two lines of symbols, or the spacing of the symbols between them.

The use of such a transfer positioning device thus makes it also possible to perform settings, repairings and production modifications in relation to the transfer support (40) also in concurrent operation time. The transfer and station supports (30, 40) being fixed in relation to one another, all the setting combinations are thus possible in concurrent operation time for each station/transfer pair.

In one embodiment, a processing station comprises a station for personalizing the card (9) to be processed, for example, by magnetic writing, by electronic writing in an electronic memory, by galvanic contact or by wireless transmission by known means. This personalization may be done by magnetic writing on a magnetic stripe by a head, the relative moving of this head in relation to the card (9) to be personalized may be performed by moving the clamp (21) carrying said card.

In one embodiment, a processing station comprises a printing station using a print head, for example, by an ink jet method, the relative moving of this print head in relation to the card (9) to be printed may be performed by moving the clamp (21) carrying the card.

In one embodiment, a processing station comprises a station for identifying or controlling by known means information contained in or on a card processed or to be processed, this information may be of any known type, for example, reading of characters, checking the conformity of the printing, recognizing colours or distinctive signs, reading of data in the form of optical, electronic or magnetic information, or a combination of these types of control or information.

In the present description, the stations are referred to by description of their functionalities, but it must be obvious that several of the processing stations with identical or different functionalities may be combined in a single station without departing from the spirit of the invention.

It must be obvious to the persons skilled in the art that the present invention allows embodiments in numerous other specific forms without departing from the domain of application of the invention as claimed. Consequently, the present embodiments must be considered as illustrations, but they may be modified in the domain defined by the scope of the attached claims, and the invention must not be limited to the details given above.

The invention claimed is:

1. Plastic card processing device, comprising a movable transport structure carrying at least one transport device, the transport device comprising a card holder to receive at least one plastic card from at least one supply station and conveying said card to one or more processing stations, the transport device being movable in relation to the transport structure and allowing moving of the card towards the processing station or moving inside the processing station, or a combination of the two, without leaving said transport structure, characterised in that the card processing device comprises at least one transfer drive mechanism to move the at least one transport device on said transport structure, and wherein said transport structure comprises a rigid barrel of essentially cylindrical shape that conveys by rotation about one barrel axis the transport device from one station to another.

2. The device according to claim 1, characterised in that said transfer drive mechanism is fixed in relation to at least one corresponding processing station, the transfer drive mechanism is adapted to place and move the at least one transport device carrying a card, so that said card is processed in the processing station without being released by the transport device.

3. The device according to claim 2, characterised in that the at least one transfer drive mechanism is carried in a transfer position by a transfer support fixed in relation to the corresponding processing station, the position of this transfer drive mechanism in relation to this corresponding processing station being determined by a transfer positioning device comprising at least one first indexing part, moveable relative to the transfer support in a direction parallel to an axis of symmetry of the transport structure, and reversibly separable from at least one second indexing part, integral with the transport device, these two indexing parts comprising positioning means working together to form a stop ensuring an identical position of this transport device in relation to the corresponding processing station after separation and remounting of these two reference parts, or after replacement of this transport device by a following transport device.

4. The device according to claim 3, characterised in that at least one transfer drive mechanism comprises first setting means allowing modification or adjustment of the position of the first indexing part of said transfer drive mechanism.

5. The device according to claim 4, characterised in that at least one transfer drive mechanism comprises second setting means allowing adjustment of the position of the transfer drive mechanism in relation to the transfer support.

6. The device according to claim 1, characterised in that the at least one processing station is carried by a station support structure, the position of this processing station in relation to the station support being determined by a station positioning device comprising at least one first reference part, integral with the station support, reversibly separable from at least one second reference part, integral with this so-called corresponding processing station, these two parts comprising positioning means working together to form a stop ensuring an identical position for this processing station in relation to the station support after separation and remounting of these two reference parts, or after replacement of this processing station by another.

7. The device according to claim 6, characterised in that the at least one station positioning device comprises first setting means allowing modification or adjustment of the position of the first reference part of said station positioning device in relation to its station support.

8. The device according to claims 6, characterised in that the at least one station positioning device comprises second setting means allowing adjustment of the position of the corresponding processing station in relation to the second reference part of said station positioning device.

9. The device according to claim 1, characterised in that the card holder of at least one transport device comprises at least one clamp comprising an upper jaw and a lower jaw maintained normally closed on the card by at least one spring.

10. The device according to claim 9, characterised in that the clamp maintains the card by means of members, called pads, of an elastic material that is bent under the force of closing and thus limits the contact pressure applied to at least one of the surfaces of the card to avoid marking the card.

11. The device according to claim 9, characterised in that the clamp presents operating means comprising at least one opening rod operating the opening of the jaws of the clamp under the action of an actuator external to the clamp.

12. The device according to claim 1, characterised in that at least one transport device is driven by at least one transfer drive mechanism according to a linear movement, parallel to the barrel axis, and is guided by guiding means integral with the barrel.

13. The device according to claim 1, characterised in that the at least one transfer drive mechanism comprises motorisation means allowing continuous movement and being able to stop in any intermediate position without being limited by a minimum moving step.

14. The device according to claim 1, characterised in that the at least one transfer drive mechanism acts on the at least one transport device by an indexing finger driven by a belt, the belt being driven by a motor incorporating a position marker and a servo system for moving to this marker.

15. The device according to claim 1, characterised in that the supply station receives the cards by means of a conveyer along a direction parallel to the barrel rotation axis, the transport structure carrying each transport device to at least one supply station after passing through at least one processing station , so that the card processed is deposited on the same conveyer that previously carried the card to said supply station.

16. The device according to claim 1, characterised in that the at least one processing station comprises one station for embossing cards by plastic deformation or 3 dimensional stamping.

17. The device according to claim 16, characterised in that the at least one station for embossing comprises at least one embossing wheel carrying two sets of male and female matrices arranged in rings around the axis of this wheel and performing the embossing by approaching themselves along a direction parallel to this axis, the passage from one character to be embossed to another on the card to be embossed being done by moving of the transport device carrying said card.

18. The device according to claim 16, characterised in that the at least one station for embossing comprises at least one embossing wheel driven directly by a motor of a type incorporating a position marker and a servo system for moving to this marker.

19. The device according to claim 16, characterised in that the at least one station for embossing comprises at least one embossing wheel whose characters are stamped by an electromagnet or a solenoid by means of at least one angular gear mechanism.

20. The device according to claim 19, characterised in that the at least one angular gear comprises at least one of its parts movable which, after a character is stamped, is returned to its original position by at least one return spring.

21. The device according to claim 1, characterised in that the device comprises several stations for embossing or 3 dimensional stamping, each station performing the embossing of a different area on the same card.

22. The device according to claim 1, characterised in that the at least one processing station comprises a test station checking the conformity of the processing completed or to be completed on a card, compared with the predetermined or personalised information.

23. The device according to claim 1, characterised in that the at least one processing station comprises a station for personalisation of information of the electronic, magnetic, optical type, or a combination of these types, contained in a card.

24. The device according to claim 1, characterised in that at least one processing station comprises a station for printing cards.

25. A device comprising a card conveyor for delivering cards to a plurality of transport devices adapted to receive the cards, said transport devices being mounted for movement on a barrel that is rotatable to bring each transport device in front of a processing station, actuating means for moving said transport devices on the barrel toward the processing station for and during processing of the card on the transport device and, after processing, said barrel being further rotatable for enabling transfer of the transport devices to another processing station or back to the card conveyor.

* * * * *